Figure 1:
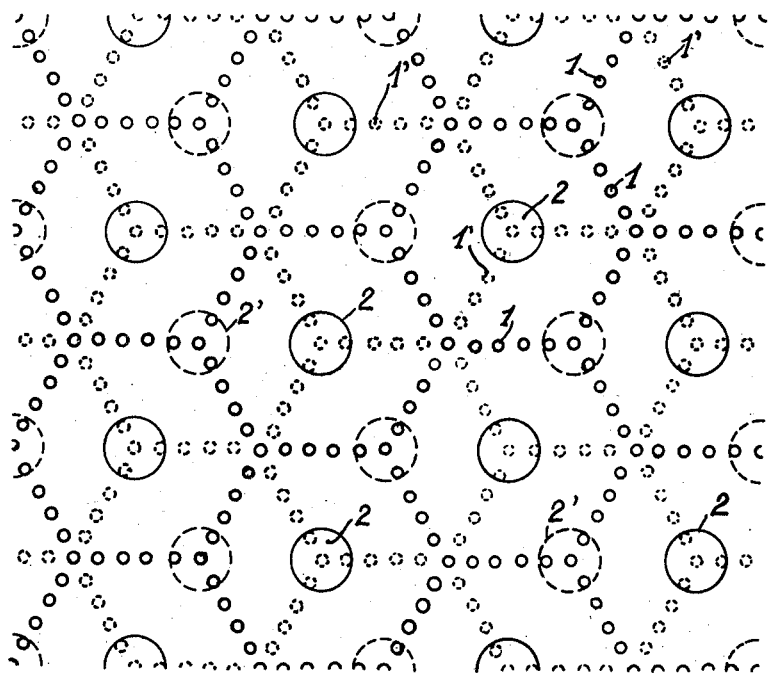

May 11, 1937.  R. MAGNIEN  2,080,083
MANUFACTURE OF HARDENED OR TEMPERED GLASS PLATES
Filed May 22, 1935   2 Sheets-Sheet 1

INVENTOR
Raymond Magnien
BY
Emil Börnelyche
ATTORNEY

Patented May 11, 1937

2,080,083

UNITED STATES PATENT OFFICE 2,080,083

MANUFACTURE OF HARDENED OR TEMPERED GLASS PLATES

Raymond Magnien, Paris, France, assignor to Société Assurex "Le Roi des Verres de Sécurité" Magnien, Monnier & Cie., a corporation of France, and Léon Alfred Edouard Petit Application May 22, 1935, Serial No. 22,904
In France June 8, 1934

3 Claims. (Cl. 49—45)

This invention relates to a method of and to a device for hardening glass plates.

As it is well-known, in order to harden a glass plate, the plate to be hardened is brought to a temperature which is higher than its softening point and then suddenly cooled.

In order to obtain a sudden cooling effect it has been proposed to use cold air jets which are uniformly distributed on both sides of the plate. The local cooling produced by the said air jets produces a system of tensions and compressions forming an equilibrated net having particular resistance properties and, in the case of breakage, the property of breaking into pieces of small dimensions.

The use of a system of cold air jets regularly distributed opposite the plate to be hardened causes a maximum cooling at certain predetermined points which are surrounded by concentric zones where the cooling takes place more slowly. Such a process produces a hardened glass having the desired properties, but it has been found that local deformations and visible irisations were produced, which were prejudicial to the neat appearance and the transparency of the hardened glass plates.

In order to remedy such disadvantages, it has been proposed to provide a rotary movement, generally a circular movement, between the glass plate and the air jets.

In fact this method permits of better distribution of the hardening effects according to predetermined lines, to regulate the rate of cooling and thus to diminish the irisations, but this solution requires the use of mechanical devices which are expensive and delicate in operation.

Furthermore, with the movable air jets as well as with the fixed air jets, the air being heated through its contact with the glass plate tends to rise along the latter. The result of this is that a stream of hot air is produced along the plate, which counteracts the effect of the normal air jets, particularly in the upper part of the plate. The hardening effect is irregular over the whole surface and if the plate is one of large dimensions it may even happen that a part of the same is ill-hardened or not hardened at all.

This invention provides a method and a device for hardening glass plates, which permit of insuring a convenient cooling in predetermined directions and a uniform hardening on the whole surface of the glass plate for any dimension of the latter without the use of mechanical devices.

This method comprises providing in contact with the glass plate fixed regular air streams of positive directions through simultaneous blowing and suction. The air is blown through openings of small dimensions arranged along the sides of a network of adjacent regular polygons and it is sucked after having passed over the plate through larger openings arranged in the middle of the said regular polygons.

This method insures a definite path for the air jets and thus there is no hot air current along the plate counteracting the passage of the upper air jets, as with the known methods. As the air jets are fixed and distributed in predetermined directions, the cooling is regularly effected from the sides of the blowing polygons to the middle of the latter, thus providing a predetermined network of tensions and compressions.

The blowing and the suction may be regulated simultaneously or separately. It is thus possible to cause a larger mass of cold air to pass in contact with the treated plate without any risk of causing deformations due to the vis viva of the air projected on to the material which has been brought to its softening point.

In a device for carrying this method into effect, the suction and blowing openings are distributed on a plane surface which is brought to the neighbourhood of the glass plate to be treated. The distance between the said plane surface and the glass plate can be adjusted as desired. The plane surface provided with the openings is integral with two boxes, one of the said boxes receiving the air under pressure and being in communication with the small blowing openings, while the other is subject to a vacuum and receives the air which is drawn in through the large suction openings. Such a device may be provided for acting either on one side or on both sides of the glass plate. In this latter case, the openings which are on both sides of the plate are advantageously alternated in order better to distribute the effects of cooling.

A construction of the device according to the invention is shown by way of example in the accompanying drawings, in which Figure 1 is a diagrammatic view of the arrangement of the blowing and suction openings.

Figure 2:
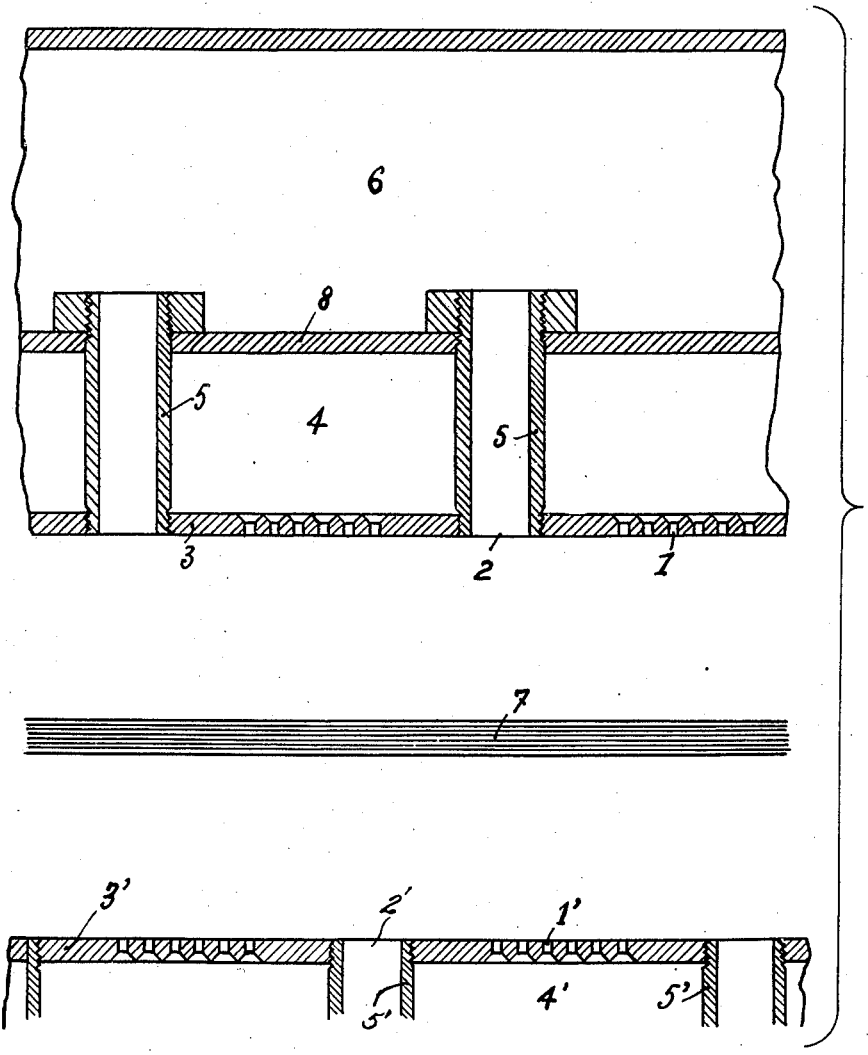

Fig. 2 is a fragmentary view in section of a plate of glass with an air-circulating device on each side thereof.

The openings which are shown in full lines relate to the device located on the one side of the glass plate and the openings indicated in dotted lines relate to the device located on the other side.

The device for hardening glass plates comprises a series of blowing openings 1 of small dimensions arranged along the sides of adjacent regular polygons.

The said polygons are preferably regular hexagons as shown in the drawings. They may also be regular polygons having a larger or smaller number of sides.

In the middle of the said hexagons larger openings 2 are arranged which serve for the suction jets. The whole of the openings 2 is thus arranged in staggered relation on successive lines.

On the opposed surface of the glass plate there is provided a similar device formed of blowing openings 1'' and of suction openings 2' and the said openings are advantageously arranged in staggered relation with respect to the openings 1 and 2, the displacement being by a linear distance equal to the length of a side of the polygon.

In a convenient arrangement of the openings (Figure 2) the openings 1—1' and 2—2' are arranged on two plane plates 3 and 3'. The openings 1 are in communication with a box 4 in which the air is maintained under pressure either by a fan or through a connection with a source of compressed air which is provided, if necessary, with a pressure reducing valve. The openings 2 are connected through branches 5 which pass through the box 4 with a box 6 maintained under vacuum.

The air delivered into the boxes 4—4' is projected on to the glass plate 7 through the openings 1 and 1'. The air streams, which are heated through their contact with the said plate 7, are drawn in through the openings 2—2' and enter the boxes 6—6' through the branches 5—5'. The hot air which is thus collected in the boxes 6—6' is discharged into the open air or it may be used for preheating of any kind, for instance for preheating the glass plate, which permits recovering the sensible heat of the preheated air.

Adjusting devices such as throttle valves or slide valves (not shown) may be provided for adjusting the equality of the blowing on each side of the plate 7. They may also provide for adjusting the suction and the blowing with respect to each other. In a like manner, devices (not shown) may be provided for adjusting the distance between the surfaces 3 and 3' and the plate 7 to be hardened, according to the thickness of the plate and its dimensions.

Having now particularly described and ascertained the nature of my said invention and in what manner the same is to be performed, I declare that what I claim is:

1. Apparatus for the non-isotropic hardening of glass plates, comprising a casing having one of its walls parallel to and spaced from one surface of the glass plate to be hardened, a pressure chamber and a suction chamber in said casing, a series of nozzles extending from the pressure chamber to the outer surface of the wall and arranged along the sides of contiguous regular polygons, and a second series of nozzles extending from the suction chamber to said surface, these suction nozzles being of larger cross-section than the pressure nozzles and arranged each at the center of one of the said polygons.

2. Apparatus according to claim 1, comprising a second similar casing facing the other surface of the glass plate and having its polygonal arrangement of pressure and suction nozzles displaced by the length of one side of the polygon from the first nozzle arrangement.

3. Apparatus for the non-isotropic hardening of glass plates, comprising a casing having one of its walls parallel to and spaced from one surface of the glass plate to be hardened, a pressure chamber and a suction chamber in said casing, a series of nozzles extending from the pressure chamber to the outer surface of the wall and arranged along the sides of contiguous regular hexagons, and a second series of nozzles extending from the suction chamber to said surface, these suction nozzles being of larger cross-section than the pressure nozzles and arranged each at the center of one of the said hexagons.

RAYMOND MAGNIEN.